(12) United States Patent
Bellur et al.

(10) Patent No.: US 8,904,183 B2
(45) Date of Patent: *Dec. 2, 2014

(54) EFFICIENT TECHNIQUE TO ACHIEVE NON-REPUDIATION AND RESILIENCE TO DOS ATTACKS IN WIRELESS NETWORKS

(75) Inventors: Bhargav R. Bellur, Bangalore (IN); Aravind V. Iyer, Bangalore (IN); Debojyoti Bhattacharya, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 866 days.

This patent is subject to a terminal disclaimer.

(21) Appl. No.: 12/731,833

(22) Filed: Mar. 25, 2010

(65) Prior Publication Data

US 2011/0238997 A1 Sep. 29, 2011

(51) Int. Cl.
*H04L 9/32* (2006.01)
*H04L 29/06* (2006.01)
*H04W 12/06* (2009.01)
*G08G 1/16* (2006.01)
*H04W 4/04* (2009.01)
*H04L 9/16* (2006.01)

(52) U.S. Cl.
CPC ............ *H04L 63/1458* (2013.01); *G08G 1/161* (2013.01); *H04W 12/06* (2013.01); *H04W 4/046* (2013.01); *H04L 63/08* (2013.01); *H04L 9/3236* (2013.01); *H04L 9/16* (2013.01); *H04L 9/3244* (2013.01)
USPC .......................................... 713/176; 713/170

(58) Field of Classification Search
CPC ............ H04L 63/08–63/0892; H04L 2209/84; H04L 9/14–9/16; H04L 9/32–9/3297; H04W 4/04–4/046; H04W 12/06
USPC .............. 701/1, 116, 300; 709/204, 223–224, 709/227–228; 713/150, 160–161, 168–181; 726/2–7; 380/270–274
See application file for complete search history.

(56) References Cited

U.S. PATENT DOCUMENTS

2006/0200856 A1* 9/2006 Salowey et al. ................... 726/5
2008/0235509 A1* 9/2008 Laberteaux et al. .......... 713/156

(Continued)

OTHER PUBLICATIONS

Perrig et al. "Timed Efficient Stream Loss-Tolerant Authentication (TESLA): Multicast Source Authentication Transform Introduction". Request for Comments: 4082. <http://www.ietf.org/rfc/rfc4082.txt>. Published: Jun. 2005.*

(Continued)

*Primary Examiner* — Andrew Goldberg
*Assistant Examiner* — Kevin Bechtel
(74) *Attorney, Agent, or Firm* — John A. Miller; Miller IP Group, PLC

(57) ABSTRACT

A computationally efficient message verification strategy that achieves non-repudiation and resilience to computational denial of service attacks in conjunction with a broadcast authentication protocol that authenticates messages using a combination of a digital signature and a TESLA MAC. When messages are received at a receiver, the verification strategy separates the messages into messages with the same sender identification. The strategy then determines whether the TESLA MAC authenticator is valid for each message and discards those messages that do not have a valid TESLA MAC. The strategy collects the messages that have a valid TESLA MAC for each sender identification and performs a batch verification process on the group of messages to determine if the messages in the group have a valid digital signature. This strategy verifies each message in the group of messages if the batch verification process shows that the group of messages has a valid digital signature.

14 Claims, 2 Drawing Sheets

(56) References Cited

U.S. PATENT DOCUMENTS

2009/0254754 A1* 10/2009 Bellur et al. .................. 713/176
2010/0019892 A1* 1/2010 Roh et al. ..................... 340/436

OTHER PUBLICATIONS

Krishnan, Hariharan. ""Verify-on-Demand"—A Practical and Scalable Approach for Broadcast Authentication in Vehicle Safety Communication". <http://www.ip.com/pubview/IPCOM000175512D>. IP.com No. IPCOM000175512D. Published: Oct. 2, 2008.*

Jung Hee Cheon and Dong Hoon Lee, "Use of Sparse and/or Complex Exponents in Batch Verification of Exponentiation", IEEE Transactions on Computers, vol. 55, No. 12 (2006), pp. 1536-1542.

L. Harn, "Batch verifying multiple RSA digital signatures", Electronics Letters, vol. 34, No. 12 (1998), pp. 1219-1220.

David Naccache, David M'Raihi, Serge Vaudenay and Dan Raphaeli, "Can D.S.A. be improved? Complexity trade-offs with the digital signature standard", Advances in Cryptology—EUROCRYPT'94, Lecture Notes in Computer Science, vol. 950 (1995), pp. 77-85.

Mihir Bellare, Juan A. Garay, and Tal Rabin, "Fast Batch Verification for Modular Exponentiation and Digital Signatures", Advances in Cryptology—EUROCRYPT'98, Lecture Notes in Computer Science, vol. 1403 (1998), pp. 236-250.

* cited by examiner

EFFICIENT TECHNIQUE TO ACHIEVE NON-REPUDIATION AND RESILIENCE TO DOS ATTACKS IN WIRELESS NETWORKS

BACKGROUND

1. Field of the Invention

This invention relates generally to a system and method for authenticating a message transmitted in a wireless network and, more particularly, to a system and method for authenticating a message transmitted in a wireless network that employs both a digital signature and timed efficient stream loss-tolerant authentication (TESLA).

2. Discussion of the Related Art

Automotive active safety applications based on vehicle-to-vehicle (V2V) communications are a powerful service that can significantly reduce the number of automotive accidents, and related health care and insurance costs. Communications security is critical in these applications, since drivers of vehicles are expected to act in accordance with the warnings and advisories provided by the V2V applications. However, since communications security comes with both computational and bandwidth related overhead, it is important to reduce these overheads in order to obtain cost-effective implementations.

V2V safety applications, such as blind spot warning (BSW) and co-operative collision warning (CCW), rely on the repeated exchange of kinematical information between neighboring vehicles by V2V communications as per the wireless dedicated short range communication (DSRC) standard. These messages are typically transmitted periodically, at the frequency of 10 Hz per vehicle, and are authenticated using digital signatures based on an underlying public key infrastructure (PKI) in accordance with the IEEE 1609.2 standard specification. However, generating and verifying digital signatures consumes a significant amount of the share of the automotive processor. As the penetration of V2V-based active safety applications increases, there is a need for computationally efficient mechanisms for verification of messages since V2V-equipped vehicles would have to verify an increasing number of messages.

Each principal in a PKI system has a pair of keys, namely a private key and a public key. The private key is known only to the principal and the public key can be shared with other entities in the system. The keys can be visualized as a pair of functions $P_r$ and $P_u$ representing the private and public keys, respectively, and having the property $M=P_r(P_u(M))$ and $M=P_u(P_r(M))$, where M is the message that is to be secured using the keys. To ensure message integrity, the sender of the message signs the message with its private key, and adds this signature to the message. Upon receiving the message, the recipient can verify the signature of the message using the sender's public key.

Although the discussion herein pertains to V2V networking, the various broadcast authentication techniques have a much wider application. At an abstract level, the various broadcast authentication techniques discussed herein apply to communication networks where nodes broadcast information to one another in an authentic manner. In these networks, potentially every node is a sender and a receiver. Thus, a given node would broadcast its messages to multiple nodes, and it may also receive messages from multiple, and possibly different, nodes. It is desirable to conserve bandwidth in these types of communication networks. Bandwidth is consumed when the public key is sent ahead of the messages or packets. Additional bandwidth is also consumed when signatures are appended to messages or packets. It is also desirable to conserve the use of the vehicle computer or CPU for verifying received messages. If all nodes send messages at some rate, then a vehicle might receive many more messages as compared to how many it sends. Thus, generally, when computational overhead is referred to, the time taken for key generation and signature generation is ignored, and the process focuses only on the time taken for signature verification.

For the communications networks being discussed herein, the nodes would typically use an authentication protocol to achieve broadcast authenticity of the messages. An authentication protocol between a sender and a receiver enables the sender to send information to the receiver in an authentic manner. The authentication protocol used in the broadcast networks being discussed includes three steps, namely, key generation and public key distribution, signature generation and signature verification. For key generation and public key distribution, the sender executes a key generation algorithm for the authentication protocol and creates the public key, the private key and other variables. The sender then disseminates the public key to the receivers.

For signature generation, when the sender needs to send an authentic message, the sender creates the message and populates it with the appropriate information, and then uses a signature generation algorithm specific to the authentication protocol. In the case of digital signature algorithms, one public-private key pair can be used to sign a theoretically unlimited number of messages. The signature generation algorithm generally uses the hash-and-sign paradigm. This means that the message is first hashed into a constant length string of bits. The hashed version, also called the message digest, is then signed using the signature generation algorithm.

For signature verification, when a receiver needs to verify the authenticity of a received message, it needs to have in its possession the public key corresponding to the private key that signed the message. Assuming that the receiver does have the public key, it uses the signature verification algorithm for the authentication protocol. The verification algorithm also first hashes the message to derive the message digest, which is then subject to further verification steps.

At the security layer of the PKI protocol, the primary functionality of the broadcast authentication protocol is to filter bogus messages, i.e., those messages with the correct format, but with an invalid signature or authentication tag. The security strength of the broadcast authentication protocol is measured in n-bits of security, i.e., an attacker needs to perform $O(2^n)$ operations in order to forge a signature or authentication tag on a message. The IEEE 1609.2 standard recommends 128-bits of security.

While message authentication is sufficient to develop misbehavior detection algorithms at the application layer, non-repudiation is a required attribute to report misbehaving entities to the certifying authority (CA) in a PKI-based V2X (vehicle-to-infrastructure) security architecture. Note that the eventual eviction of misbehaving entities occurs via entries in a certificate revocation list (CRL) disseminated by the CA.

To verify whether a message is genuine or bogus consumes computational resources at a given node. In the wireless context, it is easy for a malicious entity without access to compromised keying material to create a bogus message, and inject those messages in the channel leading to a computational denial of service (DoS) attack. The notion of computational DoS resilience is introduced as the amount of computational work done by a receiver versus the amount of computational work done by the attacker. Unfortunately, digital signatures based on asymmetric key cryptography are particularly vulnerable to computational DoS attacks.

Note that broadcast authentication requires the asymmetric property that only the sender is able to generate the signature, or authentication tag, and any receiver is able to only verify the signature, or authentication tag. While asymmetric key cryptography can provide all the primitives required for broadcast authentication, primitives based on symmetric key cryptography are preferred because of their efficiency. Protocol constructions to attain broadcast authentication using symmetric key primitives include timed efficient stream loss-tolerant authentication (TESLA) and one-time signatures. In the vehicle ad-hoc network (VANET) context, however, these protocols piggyback on a PKI-based digital signature mechanism.

Persistent applications, such as BSW (Blind Spot Warning) or CCW (Cooperative Collision Warning), are based on vehicles transmitting on a continual basis, such as at the rate of ten messages per second. As vehicle densities increase, the rate of incoming messages to be verified increases linearly with the number of neighboring vehicles (assuming minimal losses in the wireless medium). However, the rate of outgoing messages to be signed is always bounded by the rate, such as ten messages per second. While it is possible to authenticate every outgoing message with a PKI-based digital signature, it may not be feasible to verify the digital signature of every received message at a node. Hence, the focus of efficient broadcast authentication is on efficient verification mechanisms. For example, consider 50 vehicles in the vicinity of a given tagged vehicle, each transmitting ten messages per second. The tagged vehicle receives up to 500 messages to be verified every second. Hence, for a stable system, the average verification time should be less than 2 ms.

There is an inherent asymmetry in the rate of incoming and outgoing messages in the context of a V2V network for active safety. Every V2V-equipped vehicle sends out a limited number of messages per unit time, but receives an increasing number of messages per unit time as the number of its neighbors increases. This asymmetry can be exploited by appending dual authenticators per message (one digital signature, and a lightweight authenticator). An authenticator is classified as lightweight based on the amount of time expended to generate or verify it. Nodes that come into the transmission range of the sender verify the digital signature at first, which enables them to verify the lightweight authenticator for subsequent messages.

As far as the problem of efficient broadcast authentication is concerned, there are various techniques available in the literature to address this problem. However, none of these available approaches is completely satisfactory. In particular, digital signatures result in high computational overhead, while one-time signatures, such as Merkle-Winternitz signatures, result in high communication overhead, and lightweight protocols, such as TESLA, result in delayed message authentication. Further, in one-time signatures, such as the Merkle-Winternitz signature, there is a trade-off between the computational overhead and the communication overhead, both of which increase in proportion with the number of bits being signed.

Suppose that for a given authentication mechanism, the average signing and verification times (in seconds) are denoted by $T_s$ and $T_v$, respectively. Also, let $N_{out}$ denote the rate at which the security layer receives outgoing messages to be signed per second, and let $N_{in}$ denote the rate at which the security layer receives incoming messages to be verified per second. Since the utilization of the OBU (On-Board Unit) processor is at most 100%, it follows that for a stable system $N_{out}T_s + N_{in}T_v < 1$.

A brief description of the TESLA protocol is provided including its drawbacks in the vehicular context. This provides the motivation for modifications to the TESLA protocol for VANETs, which are then presented. The TESLA protocol is described in the context of a single sender and multiple receivers. The protocol is based on the delayed disclosure of symmetric keys. Initially, a sender appends to each message, a message authentication code (MAC) based on a symmetric key known only to itself. The receiver buffers the message without being able to authenticate them, which results in a message verification delay. A short time later, when the sender discloses the symmetric key, the receiver is able to authenticate buffered messages. The TESLA protocol is based on the property of loose time synchronization i.e., the receiver knows an upper bound on the sender's local time.

The sender divides time into L intervals of length $T_{INT}$ and computes a one-way hash-chain as described below. For a symmetric key K and a one-way hash function H(·), let $H^0(K)=K$ and let $H^{i+1}(K)=H(H^i(K))$ for integer values i≥0. The TESLA protocol also has a parameter called the key disclosure delay d expressed in units of the interval length $T_{INT}$. At the start time $T_0$, the sender computes the hash-chain, denoted by [K, $H^1(K)$, $H^2(K)$, ..., $H^Q(K)$, ...] where Q>L. The sender decides on a time schedule to disclose symmetric keys of this hash-chain no earlier than the predetermined time instant.

The key disclosure schedule, denoted as (($T_0$, $T_{INT}$, $H^Q(K)$)), signifies the sender's commitment to disclose the symmetric key $H^{Q-w}(K)$ no earlier than the time instant $T_0+w \cdot T_{INT}$ for all 1≤w≤L. Before time $T_0$, the senders commitment to disclose symmetric keys is transmitted in an authentic manner to all receivers in a key disclosure schedule message. This key disclosure schedule message is signed with a digital signature, and requires support of the PKI security framework. All entities that have the key disclosure schedule (($T_0$, $T_{INT}$, $H^Q(K)$)) follow the convention that interval w denotes the time interval [$T_0+w \cdot T_{INT}$, $T_0+(w+1) \cdot T_{INT}$. In accordance with the key disclosure schedule, the sender discloses the key $H^{Q-w}(K)$ during the interval w, for 0≤w≤L.

The transmission and reception processing is described at a node. When transmitting a packet, the sender adaptively selects a value of the key disclosure delay d. The sender discloses the symmetric key corresponding to the current time interval, and appends a MAC based on a symmetric key that will be disclosed d time intervals (of length $T_{INT}$) later. Upon receiving a packet, the receiver:

1. Verifies the disclosed key is part of the hash-chain. The disclosed key is then used to verify buffered packers.

2. Determines the interval i in which the packet was transmitted based on the disclosed key in the packet, and an authentic version of the key disclosure schedule.

3. Based on its current time and a bound on the clock synchronization error, the receiver infers the latest possible interval x in which the sender could currently be in.

4. Determines the value of the parameters d in the message. If (x<i+d), the receiver buffers the packet for delayed verification. Otherwise, if (x≥i+d), it discards the packet as unsafe and drops it.

The primary advantage of TESLA is a significant improvement in the signing and verification time since the majority of messages are authenticated via a MAC based on a symmetric key. However, TESLA still requires support of the PKI-based security framework, since the key disclosure schedule has to be conveyed to all receivers in an authentic manner. In addition, TESLA requires clock synchronization at the nodes, and messages cannot be verified until the corresponding symmetric key is disclosed by the sender. Note that the parameters d and $T_{INT}$ of the TESLA protocol have to be carefully selected in order for the protocol to work well.

The main drawbacks of the TESLA protocols in the context of VANETs are described as follows. TESLA does not provide the non-repudiation property. While message authentication is sufficient to develop misbehavior detection algorithms at the application layer, non-repudiation is a required attribute for reporting misbehaving entities to the certifying authority (CA) in a PKI-based V2X security architecture. Note that the eventual eviction of misbehaving entities occurs via entries in a certificate revocation list (CRL) disseminated by the CA. DSRC (Dedicated Short Range Communications) channel switching between the control channel and service channel can also degrade the performance of TESLA.

V2X safety applications transmit real-time kinematic information (such as position, speed, and heading) in the message payload. Typically these messages are sent from the application layer to the security layer at the periodic rate of 100 ms. If TESLA key disclosure messages are always piggybacked with application messages, then $T_{INT}$=100 ms, where $T_{INT}$ denotes the length of the time intervals selected by the TESLA protocol. Hence, a lower bound on the message verification delay is 100 ms. This verification delay may be too large for V2X safety applications, such as collision avoidance applications. Note that a vehicle traveling at 90 kph (25 meters per second) would have moved 2.5 meters in 100 ms.

There are two types of potential attackers. An outside attacker that does not possess any compromised cryptographic credentials, such as private keys. The outside attacker can mount a DoS attack by sending bogus messages that have a valid format, but an incorrect authentication tag. This type of attacker steals a valid sender identification tag from the air, and transmits bogus messages on its behalf, overloading the receiving vehicles processor (buffers) for the computational DoS (memory DoS) attack. The other type of attacker is an inside attacker that has in its possession one or more compromised cryptographic credentials, such as the private keys. This type of attacker can transmit a spurious message, i.e., message with incorrect or invalid payload by cryptographically correct authentication tag(s). In the case of a transmitted message being authenticated by both a digital signature and a TESLA MAC, referred to as a TESLA authentication and digital signature (TADS) protocol, this type of attacker can mount a particularly insidious attack, referred to as a "correct MAC fake digital signature" attack. This type of attacker can mount a correct MAC fake digital signature DoS attack by transmitting messages with correct message authentication codes, but fake digital signatures. These messages can convey false information where the attacker does not get implicated if only the MAC is verified.

SUMMARY

In accordance with the teachings of the present invention, a computationally efficient message verification strategy is disclosed that verifies messages authenticated using a combination of a digital signature and a TESLA MAC. When messages are received at a receiver, such as a vehicle, the verification strategy separates the messages into messages with the same sender identification. The verification strategy then determines whether the TESLA MAC authenticator is valid for each message and discards those messages that do not have a valid TESLA MAC. The strategy then separately collects the messages that have a valid TESLA MAC for each sender identification as a group of messages and performs a batch verification process on the digital signatures of the group of messages to determine if the messages in the group have a valid digital signature. The verification strategy achieves the property of non-repudiation for each message in the group of messages if the batch verification process shows that the group of messages has a valid digital signature.

Additional features will become apparent from the following description and appended claims, taken in conjunction with the accompanying drawings.

DETAILED DESCRIPTION

The following discussions directed to an authentication protocol for a wireless communications system that employs both a digital signature and TESLA authentication is merely exemplary in nature, and are in no way intended to limit the scope of the invention, its applications or uses.

Figure 1:
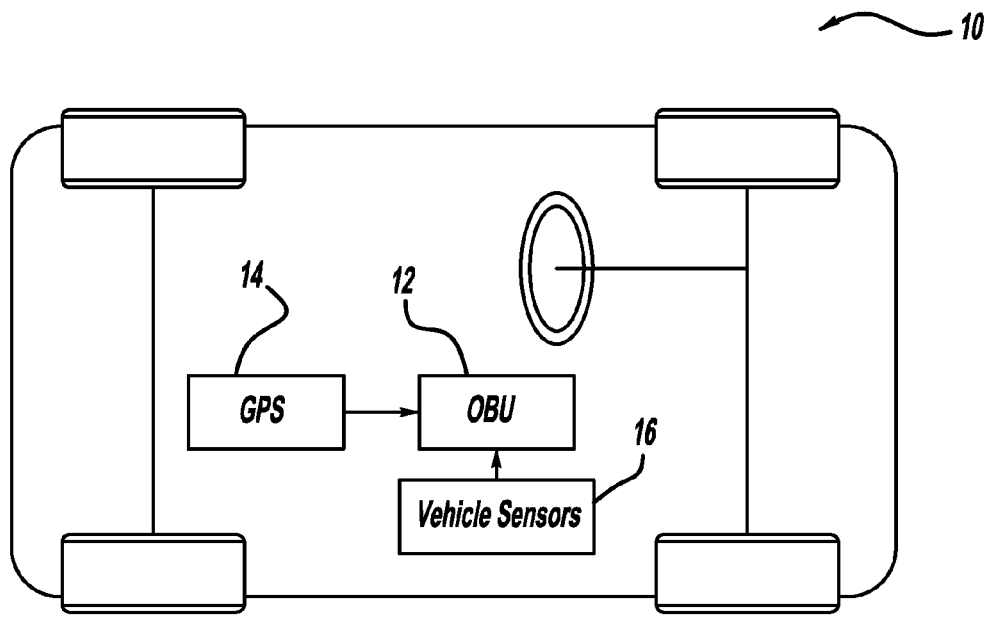
FIG. 1 is a plan view of a vehicle employing a vehicle-to-vehicle communications system.

FIG. 1 illustrates a plan view of a vehicle 10 including an on-board unit (OBU) 12 for a V2X wireless communication system. The OBU 12 receives location information from a GPS (Global Positioning System) receiver 14, and is able to communicate with other OBUs on other vehicles within a limited range. The vehicle 10 also includes various types of vehicle sensors 16, such as cameras, accelerometers, temperature sensors, etc., that provide information to the OBU 12. The vehicle sensor information can be used by the OBU 12 to notify other vehicles of various road and other conditions, such as ice, oil spills, etc.

The following describes a computationally efficient message verification strategy for a wireless network that verifies messages where each transmitted message is authenticated by both a digital signature and a TESLA MAC and is referred to as a TESLA authentication and digital signature (TADS) protocol. The TADS protocol is motivated by the observation that for the effective operation of collision-avoidance applications, it is not necessary for a given receiver to know the current kinematic state of every vehicle. Intuitively, it is sufficient if the receiver has current, i.e., up-to-date, information of the kinematic state of vehicles in its immediate geographic vicinity, and delayed information regarding vehicles that are farther away from it. The terms "immediate geographic vicinity" and "farther away" are used in a sense of geographic proximity. Note that as vehicle densities increase, the number of vehicles that are farther away from a given tagged receiver increases at a rate significantly greater than the number of vehicles that are in the immediate geographic vicinity.

In the TADS protocol, the sending vehicle affixes two authentication tags with each message. One tag is a computationally intensive, or heavyweight signature, that is a PKI-based digital signature on the message payload, which includes the current kinematic state of the sending vehicle. This signature enables a tagged receiver to obtain authentic information pertaining to the current kinematic state of the sending vehicle. The other tag is a computationally lightweight MAC based on the TESLA broadcast authentication algorithm. This authentication tag enables a tagged receiver to obtain authentic information pertaining to the kinematic state of the sending vehicle in the recent past. However, the TESLA authenticator provides an equal level of security as the digital signature. TESLA depends on the underlying PKI framework to exchange its key disclosure schedule. In addition to meeting real-time delay constraints, another dimension of the decision to verify the digital signature or the TESLA MAC of the message is whether the receiver needs to obtain the stronger security attribute of non-repudiation or the weaker notion of message authentication.

Figure 2:
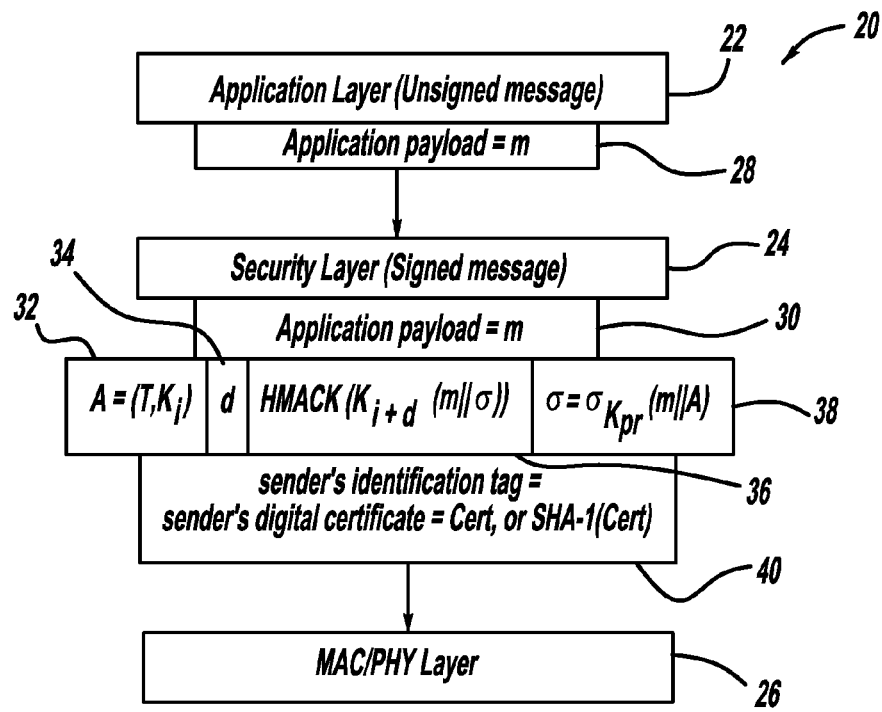
FIG. 2 is a schematic diagram of message flow in a vehicle-to-vehicle communications message from the application layer to the physical channel.

FIG. 2 is a representation of a hierarchical layer structure 20 of the TADS protocol including an application layer 22, a security layer 24 and a physical layer 26. The application layer 22 includes an unsigned message with an application payload m shown at box 28. The security layer 24 includes the signed message, including the application payload m shown at box 30 and two authentication tags, namely a digital signature σ shown at box 38 and a TESLA authenticator MAC shown at box 36 that encompasses both the message payload and the digital signature σ. The security layer 24 also includes a key disclosure schedule A shown at box 32, a TESLA disclosure delay d shown at box 34 and the senders identification tag including the senders digital certificate shown at box 40.

At the security layer 24, there are three mechanisms that are in execution, namely, a broadcast authentication mechanism, a certificate exchange mechanism and a receiver verification strategy. The broadcast authentication mechanism appends authentication tags to messages received from the application layer 22. The certificate exchange mechanism exchanges certificates between vehicles that are in the vicinity of each other. Finally, the verification strategy decides on the sequence in which to process, i.e., verify, messages received at the security layer 24.

Upon receiving an unsigned message from the application layer 22, the TADS protocol appends two authenticators to the message to generate a signed message. In particular, a computationally lightweight TESLA MAC and a digital signature are appended to generate a signed message. Before describing the generation of the dual authenticators, a mechanism is presented for vehicles to exchange their digital certificates and their TESLA key disclosure schedules A.

The certificate exchange mechanism periodically, such as 1 second, appends the sender's digital certificate to the signed message. In addition, the sender also includes its TESLA key disclosure schedule A whenever it appends its digital certificate. This enables vehicles that are in the vicinity of each other to exchange an authentic version of their public keys and key disclosure schedules A. To uniquely identify the sender of each signed message, the certificate exchange mechanism appends one of the identification tags to the message: the sender's digital certificate or some of the bytes (e.g. the least significant 10 bytes or most significant 10 bytes) of the SHA-1 hash of the sender's digital certificate. This identification tag is used by each receiver to find the relevant public key, or the TESLA key disclosure schedule A, with which to authenticate the digital signature (or, TESLA MAC) of the message.

A node maintains a cache of the digital certificates, and key disclosure schedules of vehicles it has encountered in the past. In order to enable an efficient search, it maintains this cache in a sorted order based on the bytes of SHA-1 hash, or any cryptographic hash, of the sender's digital certificate.

As mentioned above, the TADS protocol appends two authenticators to generate a signed message. The general format of the message before and after it is signed by the security layer 24 of the sender is given below. Note that the TESLA MAC encompasses both the message payload as well as the digital signature of the message.

Unsigned Message (Application payload=m).

Signed Message [Application payload=m, TESLA key disclosure=$K_i$ or TESLA key disclosure schedule A=(T, $K_i$), TESLA disclosure Key=d, TESLA MAC=HMAC($K_{i+d}$, (m||σ)), digital signature σ=$\sigma_{K_{pr}}$(m||A)].

Whenever the sender transmits its digital certificate as an identification tag, an up-to-date version of its key disclosure schedule A is also transmitted. Since certificates are transmitted periodically, any vehicle that comes into the transmission range of the sender can obtain both its digital certificate and its key disclosure schedule A. By verifying the sender's digital certificate, a node obtains an authentic value of the sender's public key. Using this, the node can verify the digital signature σ of the message, and obtain an authentic value of the sender's key disclosure schedule. This enables the node to verify the computationally lightweight TESLA MAC for subsequent messages.

When the sender transmits a hash of its digital certificate as an identification tag, it may not be useful to include the TESLA key disclosure schedule A in the message. The sender's key disclosure schedule A is useful only at a receiving vehicle that has already authenticated the sender's digital certificate during an earlier encounter with the sender, and has the sender's digital certificate stored in its cache. Whenever the sender does not include its key disclosure schedule A, it will need to include its disclosed key as part of the message. In summary, the following three message formats are the output of the signing process. To identify the type of message being transmitted by the protocol, the detailed bit-level message formats will need to include two extra bits.

Signed Message II sender's Digital certificate, where the signed Message=[Application payload=m, TESLA Key Disclosure Schedule A=(T, $K_i$), TESLA Disclosure Delay=d, TESLA MAC=HMAC($K_{i+d}$, (m||σ)), Digital signature σ=$\sigma_{K_{pr}}$(m||A)].

Signed Message II some of the bytes (e.g. least significant 10 bytes or most significant 10 bytes) of Hash (Sender's Digital certificate), where the signed Message=[Application payload=m, TESLA Key Disclosure=$K_i$, TESLA Disclosure Delay=d, TESLA MAC=HMAC($K_{i+d}$, (m||σ)), Digital signature σ=$\sigma_{K_{pr}}$(m)].

Signed Message II least significant 10 bytes of Hash(Sender's Digital certificate), where the signed Message=[Application payload=m, TESLA Key Disclosure Schedule A=(T, $K_i$), TESLA Disclosure Delay=d, TESLA MAC=HMAC($K_{i+d}$, (m||σ)), Digital signature σ=$\sigma_{K_{pr}}$(m||A)].

To complete a specific implementation of the TADS protocol, a strategy is required to verify incoming messages at a node. The verification strategy decides on the sequence in which to process, i.e., verify, received messages. In addition, for each message, the verification strategy involves making a decision whether to verify the digital signature of the message, or the TESLA authenticator, or to delay the decision until a later point in time. The strategy scheduling decisions regarding when to verify digital certificates and messages containing key disclosure schedules that provide authentic control data, i.e., public keys and key disclosure schedules pertaining to other vehicles. However, as part of a protocol standard, there is no need to standardize the verification strategy at a receiver. In particular, different original equipment manufacturers (OEMs) can implement different strategies and interoperability will still be attained. Moreover, vehicles with a faster on-board processor may implement a different verification strategy compared to normal vehicles.

For the TADS protocol, the steps involved in the verification of a message received by a node are outlined. Upon receiving a message (m, [A=($T_o$, $T_{INT}$, K) or K], d, hmac, σ, s), the receiver performs the following actions, where m denotes the message payload, s denotes the sender's identification tag, hmac and σ denotes the TESLA MAC and the digital signature associated with the message, respectively, $[A=(T_o,T_{INT}, K)]$ denotes the key disclosure schedule, K denotes the disclosed key, and d denotes the key disclosure delay.

Corresponding to the sender with the identification tag s, obtain the (authentic) value of the public key $K_{pub}^s$ and the (authentic) value of the key disclosure schedule ($T_0^s$, $T_{INT}$, $K_0^s$).

To begin with, verify that the disclosed key K is part of the hash-chain that terminates in $K_0^s$. This step depends on whether the key disclosure schedule A or the disclosed key K is part of the message.

If the key disclosure schedule is part of the message, then compute $$i = \frac{T_0 - T_0^s}{T_{INT}},$$

and verify that $H^i(K)=K_0^s$.

If the disclosed key is part of the message, compute $$j = \left\lfloor \frac{(t_{recv} + \Delta_{sync} - T_0^s)}{T_{INT}} \right\rfloor$$

where $t_{recv}$ denotes the current time at the receiver, and $\Delta_{sync}$ denotes the bound on the clock synchronization error. Verify that for some integer i, $1 \le i \le j, H^i(K)=K_0^s$.

If the above verification step fails, discard the packet. Otherwise, use the disclosed key K to verify the TESLA authenticator of buffered packets with an identification tag s that are marked safe.

The integer i computed above represents the interval i in which the sender transmitted the packet. By convention, interval w denotes the time interval $[T_0^s+w \cdot T_{INT}, T_0^s+(w+1) \cdot T_{INT})$ relative to the original key disclosure schedule ($T_0^s$, $T_{INT}$, $K_0^s$).

Based on its current time and bounds on the clock synchronization error, the receiver infers the latest possible interval x in which the sender could currently be in.

Determine the value of the parameter d in the message. If (x<i+d), the receiver buffers the packet, and marks the TESLA authenticator as being safe for verification. Otherwise, if x≥i+d, it buffers the packet, but marks the TESLA authenticator as being unsafe for verification.

The receiver maintains an estimate of the end-to-end network delay between the sender with the identification tag s and itself. Using this, it obtains an estimate the earliest time, denoted $krt_{i+d}^s$ when the symmetric key with which the message m has been authenticated will be received if the packet is marked as safe for TESLA verification.

The TESLA MAC of the message can be verified when this node receives the key $K_j^s$ for some j≥i+d, and the message is marked as being safe. The verification step involves computing $K_{i+d}^s$ from $K_j^s$, and checking that $HMAC(K_{i+d}^s, m\|\sigma)$=hmac.

To verify the digital signature of the message, verify that $(K_{pub}^s, m\|A, \sigma)$=True.

In addition, the receiver updates the key disclosure schedule for senders as $T_0^s=T_0^s+i \cdot T_{INT}$, and $K_0^s=K$.

To describe the security attributes of the TADS protocol, a specific sender ID is observed, such that the private key associated with this sender ID has not been compromised. Hence, an attacker is not is possession of the private key associated with sender ID. The guarantees provided by the TADS protocol with respect to its dual authenticators are assumed. Observe that an attacker can perform the following actions.

The underlying properties of asymmetric key cryptography and of the TESLA broadcast authentication protocol ensures that an attacker cannot craft a payload m' of its choice, and generate either the correct digital signature or the correct TESLA MAC for the message with payload m'. However, the attacker can craft a bogus message with an incorrect TESLA MAC and an incorrect digital signature. Such messages will be discarded by the TADS protocol.

Now, suppose the sender with the identification tag sender ID transmits a message with payload m and the correct TESLA MAC and digital signature. Consider the following cases:

The attacker can replay the message by modifying the TESLA MAC and retaining the digital signature. In this case, the TESLA authentication will fail, i.e., when message verification occurs at a later point in time.

The attacker can also replay the message by modifying the digital signature, and retaining the TESLA MAC. Again, since the TESLA MAC verification step at a receiver encompasses the digital signature of the received message, the lightweight TESLA authentication will fail. This also explains why the TESLA MAC computation encompasses both the message as well as its digital signature σ. In the case where the TESLA authenticator is computed only over the message payload m, an attacker can replay an authentic protocol packet by retaining the TESLA authenticator, and modifying the digital signature. In this manner, the attacker can implicate the sender in cheating, i.e., violation of the protocol by transmitting protocol packets with valid TESLA authenticator, but invalid digital signature in order to later escape implication Note that the above reasoning shows that a tagged receiver can infer the following. Whenever the TESLA MAC verification step succeeds, the digital signature associated with the message was also transmitted by the sender.

Appending dual authenticators to every message enables the complimentary attributes of both digital signatures and TESLA to be obtained. In particular, the TESLA authenticator provides for lightweight verification and resilience to computational DoS attacks. On the other hand, digital signatures provide non-repudiation and robustness to the operation of the TESLA protocol in a highly mobile wireless network. The properties of the TADS protocol are given below. The TESLA authenticator enables the protocol to attain the following attributes.

The protocol obtains message authentication with an emphasis on lightweight verification. The receiver can also infer that whenever the TESLA MAC verification step succeeds, the digital signature associated with the message was also transmitted by the sender.

Depending on the receiver verification strategy, the proposed protocol is resilient to DoS attacks. In the TADS protocol, every bogus message transmitted by an attacker for which a receiver can delay the verification of the message until a later time when the TESLA symmetric key with which the message has been authenticated would have to be disclosed by the sender results in increased resilience to computational DoS attacks.

The digital signature enables the protocol to obtain the following attributes.

The non-repudiation property is obtained when the verification of the digital signature is successful.

At a receiver, a packet is never unsafe because of the presence of the digital signature. Recall that in TESLA, a received packet is considered unsafe if, by the time it is received, the sender has already disclosed the symmetric key with which the packet was authenticated.

While verification of the digital signature is computationally intensive, it can be verified immediately.

The primary drawback of the TADS protocol is increased over-the-air bytes for the dual authenticators. In addition, there are increased processing requirements when signing a message since the sender appends dual authenticators to every message.

In TESLA, a received packet is considered unsafe if, by the time it is received, the sender has already disclosed the symmetric key with which the packet was authenticated. The end-to-end latency from the time a message is time-stamped by the security layer 24 of the transmitting vehicle to the time it is received by the security layer 24 of the receiving vehicle is examined. This end-to-end latency determines the effectiveness of the TESLA authenticator in the TADS protocol in the context of vehicular ad hoc networks.

Considering the overhead of transmitting pure key disclosure messages on the wireless medium, it is recommended that the TADS protocol operate with $T_{INT}$=100 ms. In light of the above end-to-end delays between the security layers of the transmitting and receiving vehicle, at time $t_c$, the protocol selects the TESLA disclosure delay d such that the symmetric key $K_{i+d}$ is disclosed no earlier than $t_c$+z, where z=20 ms.

VANET authentication with signatures and TESLA (VAST) is a related protocol that combines digital signatures and a variant of TESLA called TESLA for vehicular networks. VAST has been designed in order to attain resilience to both memory and computational DoS attacks. However, the VAST protocol achieves this by delaying the transmission of the real-time message payload and its digital signature. Hence, the VAST protocol may preclude selective verification techniques at a receiver until the message payload is received. Also, unlike the TADS protocol, where both the message payload and the digital signature are transmitted without delay, VAST does not inherit the instant verification property of digital signatures. However, compared to VAST, the TADS protocol requires greater memory resources to buffer packets until they are verified. In addition, the instant verification property of digital signatures may open the TADS protocol to computational DoS attacks.

Since VAST transmits the TESLA MAC and the message payload in separate, but successive packets, both of these packets have to be received at a tagged node in order to enable lightweight verification. On the other hand, the TADS protocol inherits the resilience of the TESLA protocol to message loss. In particular, to enable the lightweight verification of a packet P at a node, the TADS protocol requires the successful reception of two packets, namely, the packet P and any one of the packets transmitted by the sender after packet P. However, message loss will lead to increasing message latencies in the verification of packet P using its TESLA authenticator.

Figure 3:
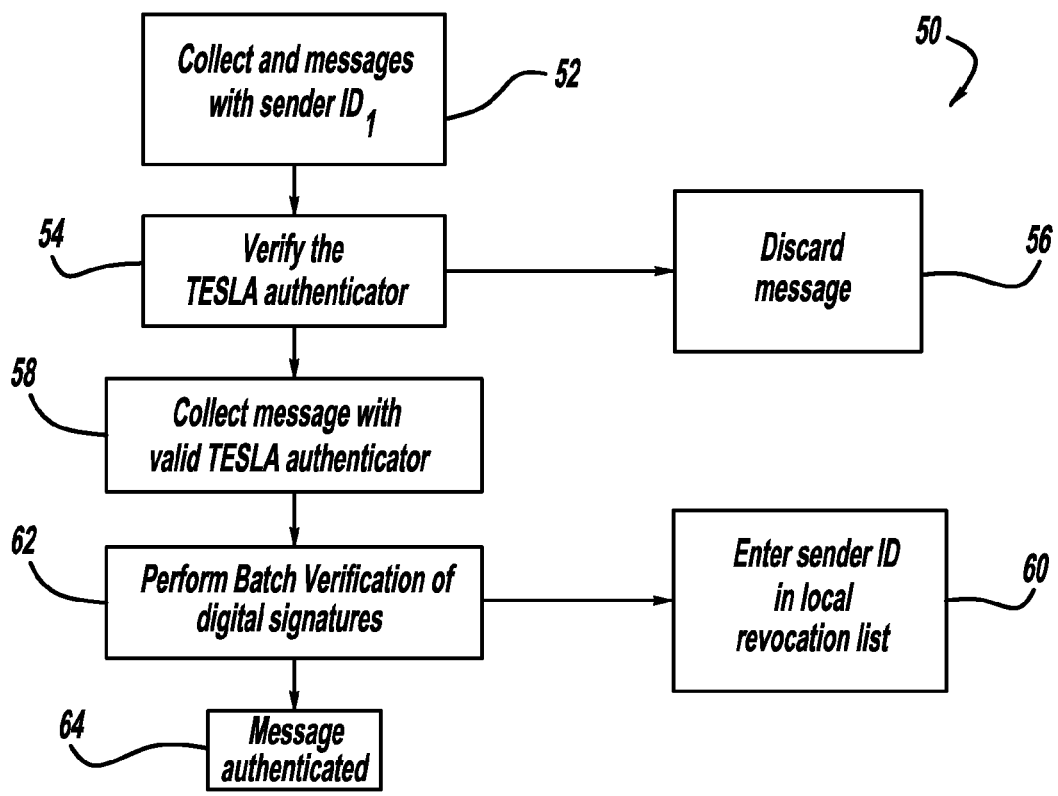
FIG. 3 is a block flow diagram showing a process for authenticating a message using digital signature and TESLA.

FIG. 3 is a flow block diagram 50 showing a process for authenticating a message at the receiver that was sent using the TADS protocol described above. The strategy first collects messages with a particular sender ID at box 52 in the receiving vehicle. The protocol then verifies the TESLA MAC or authenticator for each message at box 54 for a particular sender. If the TESLA MAC fails, meaning that the sender did not actually send the message, then the receiving vehicle discards the message as being a bogus message at box 56. The protocol then collects all of the messages from these senders that have valid TESLA MAC authenticators at box 58 and performs a batch verification process for digital signatures at box 62. Batch verification is a known algorithm for verifying many exponentiations simultaneously. It has been proposed in the art to provide batch verification of digital signatures to ease the computational burden of digital signal verification. For some signature scheme and a public key. Pk for it, let $\text{Verify}_{Pk}(.,.)$ be the verification algorithm for this scheme. In other words, a signature x for message M is valid if $\text{Verify}_{Pk}(M,x)=1$. A batch instance for signature verification consists of a sequence $(M_1,x_1), \ldots (M_n,x_n)$, where $x_i$ is a purported signature of $M_i$ relative to the public key Pk. For the vectors or batches $M=(M_1, \ldots M_n)$ and $x=(x_1, \ldots x_n)$, batch verification for the set of messages would be defined by the relation $\text{Verify}_{Pk}(M,x)$: the test would reject with high probability if there was any message, $M_i$, $1 \leq i \leq n$, for which $\text{Verify}_{Pk}(M_i,x_i)=0$. In the batch verification process, the receiving vehicle performs batch verification of a randomly chosen subset of messages that are received. By using the batch verification process, an efficient mechanism to provide non-repudiation for the batch of messages is provided, although it has a lower security strength. Verifying each message using the TESLA MAC is computationally lightweight, and is resistant to computational DoS attacks. If the digital signature authentication fails for a particular sender, then that sender ID is put in a local revocation list at box 60. If not, then the messages are authenticated at box 64. The above described process is performed for the messages received by the receiver for each different sender 1D.

The TADS verification strategy determines whether the TESLA authenticator or the digital signature will be used for authenticating a message based on how close the sending vehicle and the receiving vehicle are to each other and their current dynamic motion. For those cases where the vehicles are far enough apart and collision avoidance is not imminent, then the verification strategy can also use the delayed TESLA authenticator to determine whether the messages are authentic. However, if the vehicles are close enough where a collision is more likely, then the digital signature authentication will need to be used.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for authenticating messages received by a receiver in a wireless network transmitted by senders using a transmission protocol, said method comprising:

receiving the messages at the receiver where each message includes a lightweight computational authenticator and a heavyweight computational authenticator, wherein the lightweight authenticator is a message authentication code (MAC) for a timed efficient stream loss-tolerant authentication (TESLA) protocol and wherein the heavyweight authenticator is a digital signature;

separating the received messages into messages with a same sender identification;

determining whether the lightweight authenticator of each message is valid;

discarding a message that does not have a valid lightweight authenticator;

separately collecting the messages that have a valid lightweight authenticator for each sender identification;

performing, in a processor, a batch verification process on the messages that have a valid lightweight authenticator for each sender identification to determine if a group of messages for each sender identification has a valid heavyweight authenticator;

verifying each message in the group of messages if the batch verification process shows that the group of messages has a valid heavyweight authenticator; and determining the distance between a sender and the receiver and determining the dynamic motion of the sender and the receiver, wherein if the distance between the sender and the receiver is below a threshold and the sender and receiver dynamic motions satisfy certain requirements, the message is verified using the heavyweight authenticator only, otherwise it is verified using the lightweight authenticator.

2. The method according to claim 1 wherein the transmission protocol is a public key infrastructure (PKI) based protocol.

3. The method according to claim 1 further comprising putting a sender identification in a local revocation list if a message with that sender identification fails the batch verification process.

4. The method according to claim 1 wherein the receiver is a vehicle.

5. The method according to claim 1 wherein determining the dynamic motion of the receiver and the sender includes using kinematic models of motion.

6. The method according to claim 5 wherein using kinematic models of motion includes considering the sender's speed, acceleration, and direction of travel, the receiver's speed, acceleration and direction of travel, and the distance between the receiver and the sender.

7. A method for authenticating messages received by a receiving vehicle in a wireless network that have been transmitted by sending vehicles using a public key infrastructure (PKI) based protocol, said method comprising:

receiving the messages at the receiving vehicle where each message includes message authentication code (MAC) for a timed efficient stream lost-tolerant authentication (TESLA) and a digital signature;

separating the received messages into messages with a same sender identification;

determining whether the MAC for the TESLA of each message is valid;

discarding a message that does not have a valid TESLA MAC;

separately collecting the messages that have a valid TESLA MAC for each sender identification;

performing, in a processor, a batch verification process on the messages that have a valid TESLA MAC to determine if a group of messages has a valid digital signature;

putting a sender identification in a local revocation list if a subset of messages with that sender identification fails the batch verification process;

verifying each message in the group of messages if the batch verification process succeeds for the group of messages with the same sender ID; and determining the distance between a sender and the receiver and determining the dynamic motion of the sender and the receiver, wherein if the distance between the sender and the receiver is below a threshold and the sender and receiver dynamic motions satisfy certain requirements, the message is verified using the heavyweight authenticator only, otherwise it is verified using the lightweight authenticator.

8. The method according to claim 7 wherein determining the dynamic motion of the receiver and the sender includes using kinematic models of motion.

9. The method according to claim 8 wherein using kinematic models of motion includes considering the sender's speed, acceleration, and direction of travel, the receiver's speed, acceleration and direction of travel, and the distance between the receiver and the sender.

10. A method for authenticating messages received by a receiver in a wireless network transmitted by senders using a transmission protocol, said method comprising:

receiving the messages at the receiver where each message includes a lightweight computational authenticator and a heavyweight computational authenticator, wherein the lightweight authenticator is a message authentication code (MAC) for a timed efficient stream loss-tolerant authentication (TESLA) protocol and wherein the heavyweight authenticator is a digital signature;

separating the received messages into messages with a same sender identification; and determining the distance between a sender and the receiver and determining the dynamic motion of the sender and the receiver, wherein if the distance between the sender and the receiver is below a threshold and the sender and receiver dynamic motions satisfy certain requirements, the message is verified using the heavyweight authenticator only, otherwise it is verified using the lightweight authenticator.

11. The method according to claim 10 wherein determining the dynamic motion of the receiver and the sender includes using kinematic models of motion.

12. The method according to claim 10 wherein using kinematic models of motion includes considering the sender's speed, acceleration, and direction of travel, the receiver's speed, acceleration and direction of travel, and the distance between the receiver and the sender.

13. The method according to claim 10 wherein the transmission protocol is a public key infrastructure (PKI) based protocol.

14. The method according to claim 10 wherein the receiver is a vehicle.

* * * * *